(12) United States Patent
Li et al.

(10) Patent No.: US 11,403,606 B2
(45) Date of Patent: Aug. 2, 2022

(54) EXECUTING APPLICATION WITHOUT UNLOCKING MOBILE DEVICE

(71) Applicant: Advanced New Technologies Co., Ltd., Grand Cayman (KY)

(72) Inventors: Jing Li, Hangzhou (CN); Chunpei Feng, Hangzhou (CN); Wenbo Yang, Hangzhou (CN); Mian Huang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,547

(22) Filed: May 29, 2020

(65) Prior Publication Data

US 2020/0294013 A1    Sep. 17, 2020

Related U.S. Application Data

(63) Continuation of application No. PCT/CN2018/123140, filed on Dec. 24, 2018.

(30) Foreign Application Priority Data

Jan. 5, 2018  (CN) .......................... 201810010595.7

(51) Int. Cl.
 *G06Q 20/10* (2012.01)
 *G06Q 20/32* (2012.01)
 (Continued)

(52) U.S. Cl.
 CPC ......... *G06Q 20/108* (2013.01); *G06F 21/316* (2013.01); *G06Q 20/326* (2020.05);
 (Continued)

(58) Field of Classification Search
 CPC .............. G06F 21/316; G06Q 20/3223; G06Q 20/3276; G06Q 20/4014; G06Q 20/42;
 (Continued)

(56) References Cited

U.S. PATENT DOCUMENTS

| 9,613,352 B1 * | 4/2017 | Leoutsarakos ..... G06Q 20/4014 |
| 2011/0193857 A1 * | 8/2011 | Filippov ................. G06T 13/00 345/419 |

(Continued)

FOREIGN PATENT DOCUMENTS

| CN | 105205662 | 12/2015 |
| CN | 105653181 | 6/2016 |

(Continued)

OTHER PUBLICATIONS

NPL—Screen capture of Daniels video with date stamp.*

(Continued)

*Primary Examiner* — Abdulmajeed Aziz
*Assistant Examiner* — Mark A Malkowski
(74) *Attorney, Agent, or Firm* — Fish & Richardson P.C.

(57) ABSTRACT

Implementations of the present specification disclose mobile payment methods, apparatuses, and devices. In one aspect, the method includes: monitoring, by a terminal device that is in lock screen mode, outputs of one or more sensors of the terminal device; determining that the outputs of the one or more sensors satisfy first specified criteria indicative of one or more particular body movements; in response to determining that the outputs of the one or more sensors satisfy the first specified criteria, displaying, on the terminal device, a payment processing interface; receiving an input through the payment processing interface; and executing a payment service based on the input.

17 Claims, 5 Drawing Sheets

1. Lock screen mode
2. Trigger the terminal device to display a mobile payment interface including a scan box
3. Trigger the terminal device to switch to display a mobile payment interface including a mobile payment QR code

(51) Int. Cl.
  *G06F 21/31* (2013.01)
  *G06Q 20/40* (2012.01)
  *G06Q 20/42* (2012.01)
  *H04W 4/02* (2018.01)
  *H04M 1/72454* (2021.01)

(52) U.S. Cl.
  CPC ..... *G06Q 20/3223* (2013.01); *G06Q 20/3276* (2013.01); *G06Q 20/4014* (2013.01); *G06Q 20/42* (2013.01); *H04M 1/72454* (2021.01); *H04W 4/027* (2013.01); *H04M 2250/12* (2013.01)

(58) Field of Classification Search
  CPC ......... H04M 1/72569; H04M 2250/12; H04W 4/027
  See application file for complete search history.

(56) References Cited

U.S. PATENT DOCUMENTS

| | | | |
|---|---|---|---|
| 2012/0179965 A1* | 7/2012 | Taylor | G06F 3/04883 715/705 |
| 2014/0099886 A1* | 4/2014 | Monroe | G06F 3/0487 455/41.1 |
| 2014/0129428 A1* | 5/2014 | Tyler | G06Q 20/326 705/39 |
| 2014/0279530 A1 | 9/2014 | Douglas et al. | |
| 2014/0337243 A1* | 11/2014 | Dutt | G06Q 20/40145 705/325 |
| 2014/0344082 A1* | 11/2014 | Soundararajan | G06Q 20/3274 705/16 |
| 2014/0358786 A1* | 12/2014 | Van Heerden | G06Q 20/351 705/44 |
| 2015/0326985 A1* | 11/2015 | Priyantha | H02J 50/001 381/56 |
| 2015/0379506 A1* | 12/2015 | Griffin | G06Q 20/10 705/44 |
| 2016/0034864 A1 | 2/2016 | MacRae | |
| 2016/0071085 A1* | 3/2016 | Douglas | G06Q 20/3223 705/44 |
| 2016/0104253 A1* | 4/2016 | Song | A63F 13/323 705/15 |
| 2016/0189137 A1 | 6/2016 | Zhou et al. | |
| 2016/0224966 A1* | 8/2016 | Van Os | G06Q 20/40145 |
| 2016/0358168 A1* | 12/2016 | Van Os | G06Q 30/0226 |
| 2016/0360336 A1* | 12/2016 | Gross | H04M 1/72403 |
| 2017/0344994 A1* | 11/2017 | Wang | G06Q 50/01 |
| 2018/0130053 A1* | 5/2018 | Matthews | G07F 7/084 |
| 2018/0253717 A1 | 9/2018 | Kim et al. | |
| 2019/0066089 A1* | 2/2019 | Miryala | G06Q 20/3274 |

FOREIGN PATENT DOCUMENTS

| | | | |
|---|---|---|---|
| CN | 105791537 | | 7/2016 |
| CN | 105791537 A | * | 7/2016 |
| CN | 107122979 | | 9/2017 |
| CN | 107122979 A | * | 9/2017 |
| CN | 107180352 | | 9/2017 |
| CN | 107230066 | | 10/2017 |
| CN | 108376335 | | 8/2018 |
| WO | WO 2017051959 | | 3/2017 |
| WO | WO 2017118332 | | 7/2017 |

OTHER PUBLICATIONS

Daniels, "Walmart Scan & Go": https://www.youtube.com/watch?v=RPZqcKsCbH0, Oct. 4, 2017 (Year: 2017).*
NPL—Screen capture of Daniels video with date stamp (Year: 2017).*
Google Search, "widget definition", accessed Oct. 15, 2021 (Year: 2021).*
Wikipedia, "Software Widget", https://en.wikipedia.org/w/index.php?title=Software_widget&oldid=807344843, Published Oct. 27, 2017 (Year: 2017).*
Technopedia, "Widget", https://www.techopedia.com/definition/3452/widget, Published Dec. 9, 2016 (Year: 2016).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2018/123140, dated Jul. 7, 2020, 10 pages (with English translation).
PCT International Search Report and Written Opinion in International Application No. PCT/CN2018/123140, dated Mar. 26, 2019, 15 pages (with English translation).
Extemded European Search Report in European Application No. 18898227.6, dated Dec. 17, 2020, 9 pages.
Lü et al., "Gesture On: Enabling Always-On Touch Gestures for Fast Mobile Access from the Devise Standby Mode," Human Factors in Computing Systems, Apr. 2015, pp. 3355-3364.

* cited by examiner

EXECUTING APPLICATION WITHOUT UNLOCKING MOBILE DEVICE

CROSS-REFERENCE TO RELATED APPLICATIONS

This application is a continuation of PCT Application No. PCT/CN2018/123140, filed on Dec. 24, 2018, which claims priority to Chinese Patent Application No. 201810010595.7, filed on Jan. 5, 2018, and each application is hereby incorporated by reference in its entirety.

TECHNICAL FIELD

The present specification relates to the field of information technologies, and in particular, to mobile payment methods, apparatuses, and devices.

BACKGROUND

With the popularity of mobile payment technologies, users can perform mobile payment by using specified applications (such as mobile payment application) installed on terminal devices (such as mobile phone).

Generally, when a mobile phone of a user is in a lock screen mode, if the user needs to perform mobile payment, the user needs to first unlock the screen of the mobile phone through fingerprint verification, password input, etc. to enter an interface of an operating system. Then, only after the user starts a specified application in the interface of the operating system, the user can further trigger a mobile payment interface in an interface of the specified application for mobile payment.

SUMMARY

Implementations of the present specification provide mobile payment methods, apparatuses, and devices, to alleviate a problem that existing mobile payment methods are less convenient.

To alleviate the previous technical problem, the implementations of the present specification are implemented as below:

An implementation of the present specification provides a mobile payment method, including: monitoring, by a terminal device, body movements of a user when the terminal device is in a lock screen mode; displaying a mobile payment interface when it is determined that the monitored body movement satisfies first specified criteria; and executing a mobile payment service based on inputs received through the mobile payment interface.

An implementation of the present specification provides a mobile payment apparatus, including: a monitoring module, configured to monitor body movements of a user when the apparatus is in a lock screen mode; a display module, configured to display a mobile payment interface when it is determined that the monitored body movement satisfies first specified criteria; and an execution module, configured to execute a mobile payment service based on inputs received through the mobile payment interface.

An implementation of the present specification provides a terminal device, including one or more processors and memories, where the memories store programs, and the programs are configured to be executed by the one or more processors to perform the following steps: monitoring, by the terminal device, body movements of a user when the terminal device is in a lock screen mode; displaying a mobile payment interface when it is determined that the monitored body movement satisfies first specified criteria; and executing a mobile payment service based on inputs received through the mobile payment interface.

It can be seen from the previous technical solutions provided in the implementations of the present specification that, in the implementations of the present specification, a terminal device can monitor body movements of a user when the terminal device is in a lock screen mode; display a mobile payment interface when it is determined that the monitored body movement satisfies first specified criteria; and execute a mobile payment service based on inputs received through the mobile payment interface. According to the implementations of the present specification, the user can trigger the terminal device to display the mobile payment interface for mobile payment by performing only a body movement that satisfies the first specified criteria, without unlocking the screen of the terminal device and then starting a specified application for mobile payment. As such, the user can perform mobile payment more conveniently.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Figure 1:
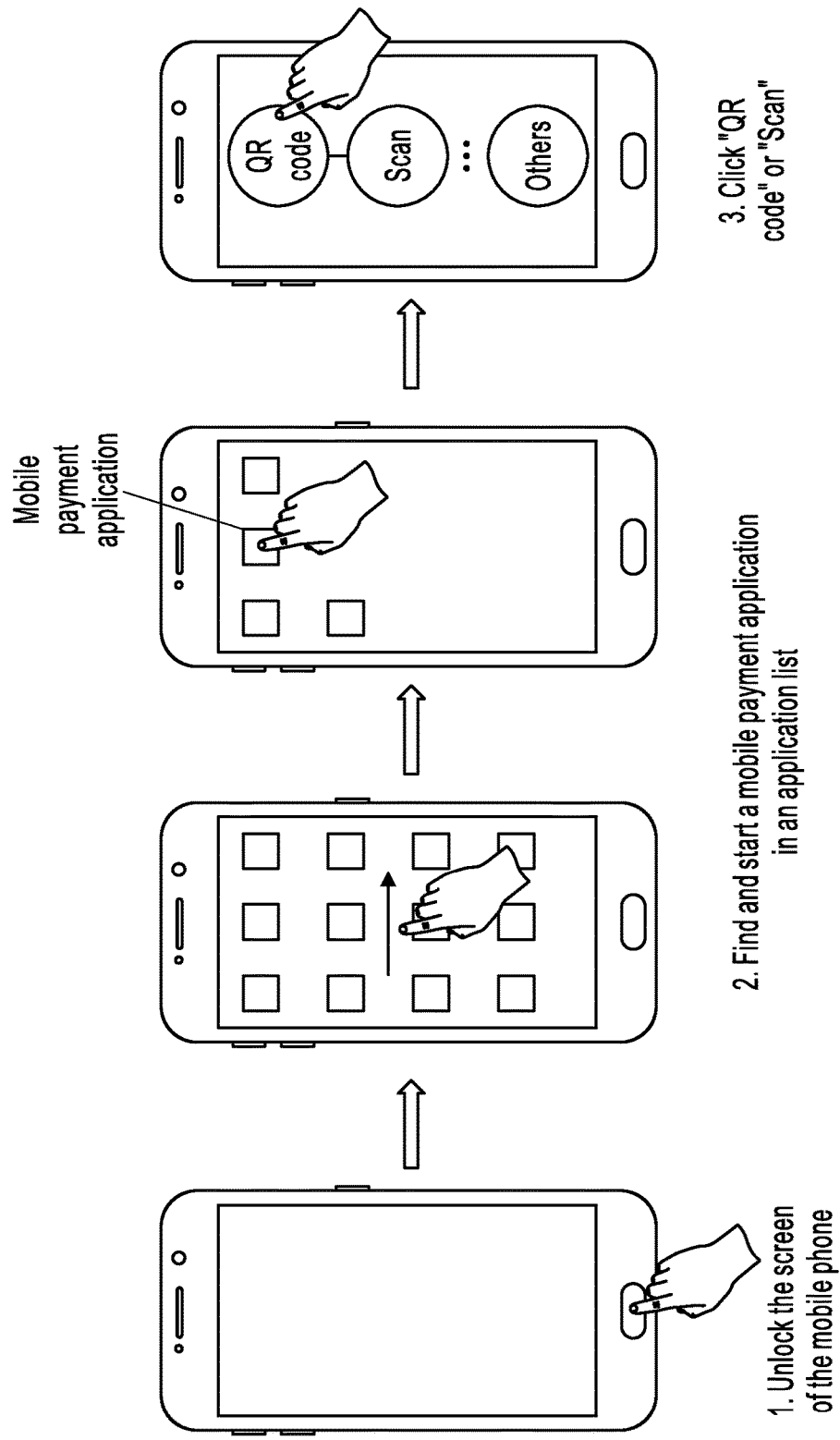
FIG. 1 is a schematic diagram illustrating steps performed by a user when the user operates a mobile phone for mobile payment in the existing technology.

FIG. 1 is a schematic diagram illustrating steps performed by a user when the user operates a mobile phone for mobile payment in the existing technology. As shown in FIG. 1, when the user needs to perform mobile payment, the user usually needs to operate the mobile phone to perform the following steps: 1. Unlock the screen of the mobile phone. 2. Find and start a mobile payment application in an application list displayed on the home screen. 3. Click "Scan" button or "QR code" button in an interface of the mobile payment application to trigger a corresponding mobile payment interface for mobile payment.

It can be seen that in the existing mobile payment method, the user usually can trigger the mobile payment interface only after performing multiple steps, which is inconvenient for the user.

However, in one or more implementations of the present specification, a terminal device can monitor body movements of a user when the terminal device is in a lock screen mode; and directly display a mobile payment interface for mobile payment when it is determined that the monitored body movement satisfies first specified criteria. It means that the user usually can trigger the mobile payment interface by performing only a body movement that satisfies the first specified criteria, so that the user can perform mobile payment more conveniently.

To make a person skilled in the art better understand the technical solutions in the present specification, the following clearly and comprehensively describes the technical solutions in the implementations of the present specification with reference to the accompanying drawings in the one or more implementations of the present specification. Clearly, the described implementations are merely some rather than all of the implementations of the present specification. All other implementations obtained by a person of ordinary skill in the art based on the implementations of the present specification without creative efforts shall fall within the protection scope of the present specification.

The technical solutions provided in the implementations of the present specification are described in detail below with reference to the accompanying drawings.

Figure 2:
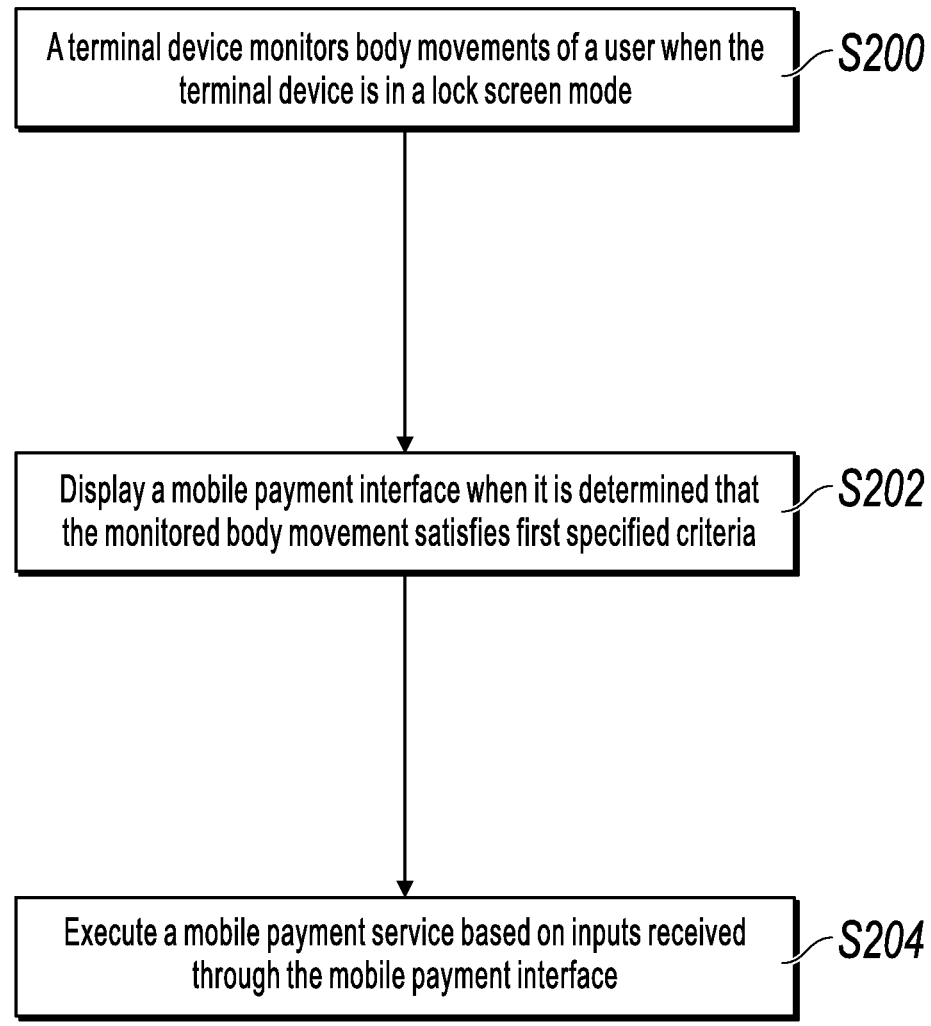
FIG. 2 is a flowchart illustrating a mobile payment method, according to an implementation of the present specification.

FIG. 2 is a flowchart illustrating a mobile payment method, according to an implementation of the present specification. The method includes the following steps.

S200. A terminal device monitors body movements of a user when the terminal device is in a lock screen mode.

The method is executed by the terminal device, and the terminal device can be specifically an intelligent device available for mobile payment, such as a mobile phone or a tablet computer of the user.

As is known to all, to prevent a user from mistakenly touching a screen or a physical key of a terminal device to mistakenly start an application installed in an operating system, or prevent other unwanted cases, the terminal device usually has a lock screen mode and an unlocked (i.e., home screen) mode. When the terminal device is in the lock screen mode, only after unlocking the screen of the terminal device to enable the terminal device to be in the unlocked mode, the user can be authorized to enter the home screen, and then can further operate an application installed in the operating system.

For example, in the existing technology, if a terminal device is in a lock screen mode, when a user needs to perform mobile payment, only after unlocking the screen of the terminal device to enter the home screen, the user can start a specified application (which can be specifically a mobile payment application) with a mobile payment function for mobile payment.

However, in this implementation of the present specification, when the terminal device is in the lock screen mode, the terminal device can monitor various body movements of the user. For example, the terminal device can monitor body movements of the user, such as blinking, hand raising, hand waving, and head shaking, by using a camera, or can monitor body movements of the user by using a built-in acceleration sensor. It is worthwhile to note that the body movement monitored by the terminal device may be neither a screen unlocking movement performed by the user nor an operation performed by the user on a screen of the terminal device.

That the terminal device monitors body movements of the user by using the acceleration sensor can be specifically monitoring a body movement (for example, shaking the terminal device) performed by the user when the user holds the terminal device. An acceleration of the terminal device can be generated due to an external force, and the acceleration sensor built in the terminal device can detect an acceleration generated during shaking of the terminal device.

S202. Display a mobile payment interface when it is determined that the monitored body movement satisfies first specified criteria.

In this implementation of the present specification, the first specified criteria can be set based on an actual need.

For example, if the terminal device monitors, by using the built-in acceleration sensor, a body movement that the user shakes the terminal device, when it is determined, by using the acceleration sensor, that an acceleration of the terminal device is greater than a specified threshold, the terminal device determines that the monitored body movement satisfies the first specified criteria.

Further, the acceleration sensor can be a tri-axis acceleration sensor, and the tri-axis acceleration sensor can be configured to detect accelerations of the terminal device on x, y, and z coordinate axes. In this case, a corresponding threshold can be predetermined for each coordinate axis. When it is determined, by using the acceleration sensor, that an acceleration of the terminal device on each coordinate axis is greater than the corresponding threshold, the terminal device determines that the monitored body movement satisfies the first specified criteria. It is worthwhile to emphasize here that the three coordinate axes can correspond to the same threshold.

In this implementation of the present specification, the mobile payment interface is an interface used to execute a mobile payment service, and only after triggering the terminal device to display the mobile payment interface, the user can enable the terminal device to execute the mobile payment service based on inputs received through the mobile payment interface.

The mobile payment interface can be an interface used to obtain collection information, for example, an interface used to scan a collection identifier (which can be specifically a collection QR code or a collection barcode), and the user can align a scan box displayed in the mobile payment interface with a collection identifier provided by a payee for scanning, to transfer money to the payee.

Alternatively, the mobile payment interface can be an interface used to display mobile payment information, for example, an interface used to display a mobile payment identifier (which can be specifically a mobile payment QR code or a mobile payment barcode) corresponding to an account of the user, and a payee can scan the mobile payment identifier provided by the user by using a scan device, to deduct money from the account of the user. Certainly, the terminal device can display both the mobile payment interface used to obtain collection information and the mobile payment interface used to display mobile payment information.

In the existing technology, a mobile payment interface is usually an interface loaded by a specified application, which imposes a need that the user can further trigger the mobile payment interface only after starting the specified application. However, in this implementation of the present specification, the mobile payment interface can be an interface loaded by an operating system of the terminal device. That is, when the terminal device determines that the monitored body movement satisfies the first specified criteria, the terminal device can display the mobile payment interface in the lock screen mode because permission of the operating system of the terminal device is not limited by the lock screen mode. As such, the user can trigger the terminal device to directly display the mobile payment interface without unlocking the screen and starting a specified application.

In addition, in this implementation of the present specification, when it is determined that the monitored body movement satisfies the first specified criteria, the terminal device can select an interface from predetermined available mobile payment interfaces, and display the interface. For example, the predetermined available mobile payment interfaces can include an interface used to scan a collection QR code, an interface used to display a mobile payment QR code, an interface used to scan a collection barcode, etc.

Further, after displaying the mobile payment interface, the terminal device can continue to monitor body movements of the user; and if it is determined that the monitored body movement satisfies second specified criteria, select another interface from the predetermined available mobile payment interfaces, and display the interface. The second specified criteria can be the same as or different from the first specified criteria.

Figure 3:
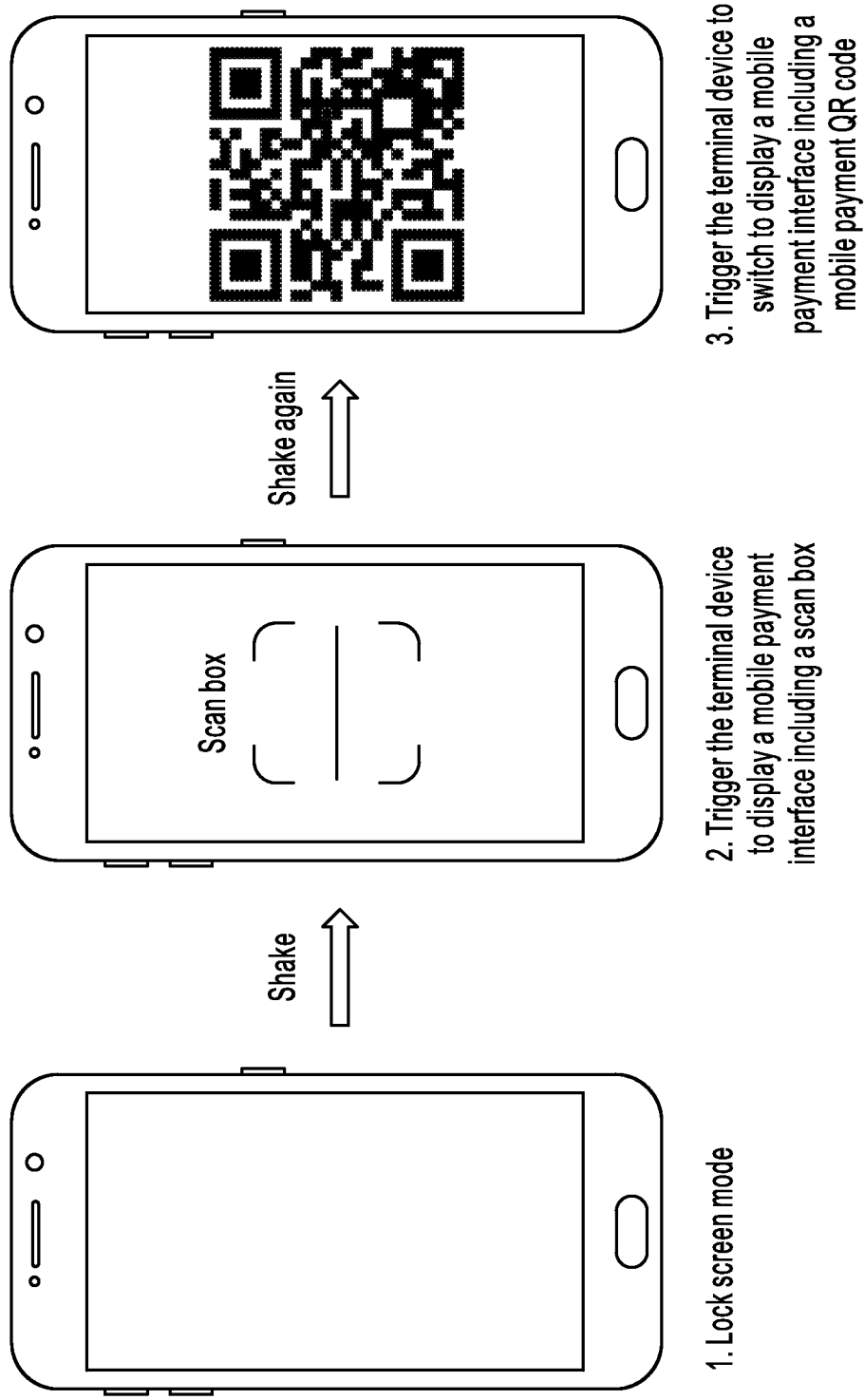
FIG. 3 is a schematic diagram illustrating a mobile payment method, according to an implementation of the present specification.

FIG. 3 is a schematic diagram illustrating a mobile payment method, according to an implementation of the present specification. As shown in FIG. 3, when a mobile phone is in a lock screen mode, a user can shake the mobile phone, so that when it is determined that an acceleration of the mobile phone is greater than a specified threshold, the mobile phone displays a mobile payment interface including a scan box, and the user can align the scan box in the mobile payment interface with a collection QR code provided by a payee. If the user wants to display a mobile payment QR code corresponding to an account of the user for mobile payment, the user can shake the mobile phone again, so that when it is determined again that an acceleration of the mobile phone is greater than the specified threshold, the mobile phone is switched to display a mobile payment interface including the mobile payment QR code corresponding to the account of the user.

S204. Execute a mobile payment service based on inputs received through the mobile payment interface.

Still referring to FIG. 3, the terminal device scans, by using the mobile payment interface including the scan box, the collection QR code provided by the payee, to obtain an account identifier of the payee and transfer money to the payee; or the payee can scan, by using a scan device, the mobile payment QR code displayed in the mobile payment interface, to deduct money from the account of the user.

In this implementation of the present specification, the terminal device can obtain rendering data from a specified application by using an operating system, and display the mobile payment interface based on the obtained rendering data. The rendering data specifically depends on a component layout in the mobile payment interface. No specific limitation is imposed thereto in the present specification.

After the mobile payment interface is displayed, the terminal device can scan a collection identifier by using the mobile payment interface, parse the scanned collection identifier to obtain payee information, and send the payee information to the specified application for mobile payment by using the operating system; or can perform mobile payment by using a mobile payment identifier displayed in the mobile payment interface, where the mobile payment identifier is obtained from the specified application by using the operating system.

Further, in this implementation of the present specification, before executing the mobile payment service based on the inputs received through the mobile payment interface, the terminal device can perform identity verification on the user, and determine that the identity verification on the user succeeds. That is, if the verification succeeds, the terminal device performs the mobile payment service; or if the verification fails, the terminal device refuses to perform the mobile payment service. A specific identity verification method can be password verification, fingerprint verification, etc.

Specifically, before displaying the mobile payment interface, the terminal device can perform identity verification on the user, and if the verification fails, the terminal device refuses to display the mobile payment interface; or before executing the mobile payment service based on the inputs received through the mobile payment interface, the terminal device can perform identity verification on the user, and if the verification fails, the terminal device refuses to execute the mobile payment service based on the inputs received through the mobile payment interface.

For example, when the terminal device displays a mobile payment interface used to scan a collection identifier, that the terminal device sends the payee information to the specified application for mobile payment by using the operating system can be specifically: obtaining, by using the operating system, a mobile payment amount entered by the user; performing identity verification on the user by using the operating system; and if the verification succeeds, sending the payee information and the mobile payment amount to the specified application for mobile payment by using the operating system; or if the verification fails, refusing to send the payee information and the mobile payment amount.

For another example, when the terminal device displays a mobile payment interface used to display a mobile payment identifier, that the terminal device obtains the mobile payment identifier from the specified application by using the operating system can be specifically: performing identity verification on the user by using the operating system; and if the verification succeeds, obtaining the mobile payment identifier from the specified application by using the operating system; or if the verification fails, refusing to obtain the mobile payment identifier.

According to the mobile payment method shown in FIG. 2, because permission of the operating system of the terminal device is not limited by the lock screen mode, when the terminal device determines that the monitored body movement satisfies the first specified criteria, even if the terminal device is in the lock screen mode, the terminal device can display the mobile payment interface and execute the mobile payment service based on the inputs received through the mobile payment interface. That is, when the user needs to perform mobile payment, the user can trigger the terminal device to display the mobile payment interface for mobile payment by performing only a body movement that satisfies the first specified criteria, without performing multiple steps, so that the user can perform mobile payment more conveniently.

Figure 4:
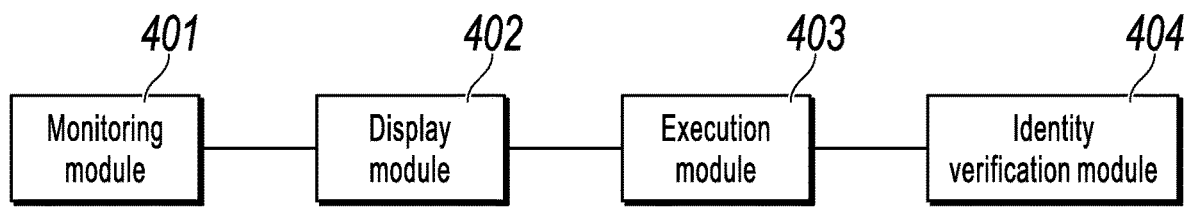
FIG. 4 is a schematic diagram illustrating a mobile payment apparatus, according to an implementation of the present specification.

Based on the mobile payment method shown in FIG. 2, an implementation of the present specification further correspondingly provides a mobile payment apparatus. As shown in FIG. 4, the mobile payment apparatus includes: a monitoring module 401, configured to monitor body movements of a user when the apparatus is in a lock screen mode; a display module 402, configured to display a mobile payment interface when it is determined that the monitored body movement satisfies first specified criteria; and an execution module 403, configured to execute a mobile payment service based on inputs received through the mobile payment interface.

The monitoring module 401 is configured to monitor the body movements of the user by using a built-in acceleration sensor; and the display module 402 is configured to: when it is determined, by using the acceleration sensor, that an acceleration of the apparatus is greater than a specified threshold, determine that the monitored body movement satisfies the first specified criteria.

The display module 402 is configured to display a mobile payment interface used to obtain collection information; and/or display a mobile payment interface used to display mobile payment information.

The display module 402 is configured to select at least one interface from predetermined available mobile payment interfaces, and display the at least one interface.

The display module 402 is configured to: after displaying the mobile payment interface, continue to monitor body movements of the user; and if it is determined that the monitored body movement satisfies second specified criteria, reselect an interface from the available mobile payment interfaces, and display the interface.

The mobile payment interface used to obtain collection information specifically includes an interface used to scan a collection identifier; and the mobile payment interface used to display mobile payment information specifically includes an interface used to display a mobile payment identifier.

The display module 402 is configured to obtain rendering data from a specified application by using an operating system, and display the mobile payment interface based on the obtained rendering data; and the execution module 403 is configured to scan a collection identifier by using the mobile payment interface, parse the scanned collection identifier to obtain payee information, and send the payee information to the specified application for mobile payment by using the operating system; and/or perform mobile payment based on a mobile payment identifier displayed in the mobile payment interface, where the mobile payment identifier is determined from the specified application by using the operating system.

The apparatus further includes: an identity verification module 404, configured to: before the execution module executes the mobile payment service, perform identity verification on the user, and determine that the identity verification on the user succeeds.

Figure 5:
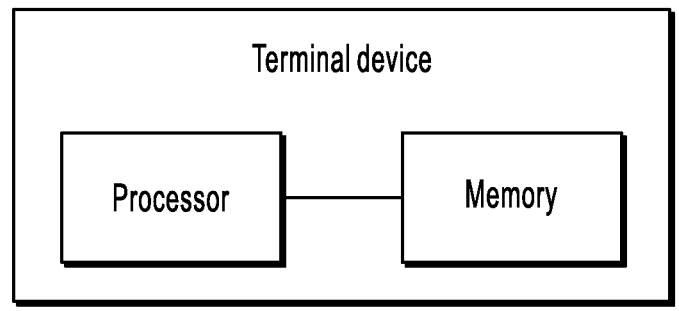
FIG. 5 is a schematic diagram illustrating a terminal device, according to an implementation of the present specification.

Based on the mobile payment method shown in FIG. 2, an implementation of the present specification further correspondingly provides a terminal device. As shown in FIG. 5, the terminal device includes one or more processors and memories, where the memories store programs, and the programs are configured to be executed by the one or more processors to perform the following steps: monitoring, by the terminal device, body movements of a user when the terminal device is in a lock screen mode; displaying a mobile payment interface when it is determined that the monitored body movement satisfies first specified criteria; and executing a mobile payment service based on inputs received through the mobile payment interface.

The implementations of the present specification are described in a progressive way. For same or similar parts of the implementations, mutual references can be made to the implementations. Each implementation focuses on a difference from other implementations. Especially, the terminal device shown in FIG. 5 is basically similar to the method implementation, and therefore is described briefly. For related parts, references can be made to some descriptions in the method implementation.

In the 1990s, whether a technical improvement is a hardware improvement (for example, an improvement to circuit structures, such as a diode, a transistor, and a switch) or a software improvement (an improvement to a method process) can be clearly distinguished. However, as technologies develop, current improvements to many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system into a single PLD, without requiring a chip manufacturer to design and manufacture a dedicated integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method process can be readily obtained provided that the method process is logically programmed by using several of the previous hardware description languages and is programmed into an integrated circuit.

A controller can be implemented by using any appropriate method. For example, the controller can be in a form a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art also knows that, in addition to implementing the controller by using only the computer readable program code, method steps can be logically programmed to allow the controller to implement the same function in a form of a logic gate, a switch, an ASIC, the programmable logic controller, or the built-in microcontroller. Therefore, the controller can be considered as a hardware component, and an apparatus that is included in the controller and configured to implement various functions can also be considered as a structure in the hardware component. Alternatively, the apparatus configured to implement various functions can even be considered as both a software module implementing the method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the previous apparatus is described, the previous apparatus is divided into various units based on functions for separate description. Certainly, when the present specification is implemented, functions of the units can be implemented in one or more pieces of software and/or hardware.

A person skilled in the art should understand that an implementation of the present specification can be provided as a method, a system, or a computer program product. Therefore, the present specification can use a form of hardware only implementations, software only implementations, or implementations with a combination of software and hardware. Moreover, the present specification can use a form of a computer program product that is implemented on one or more computer-usable storage media (including but not limited to a magnetic disk memory, a CD-ROM, an optical memory, etc.) that include computer-usable program code.

The present specification is described with reference to the flowcharts and/or block diagrams of the method, the device (system), and the computer program product according to the implementations of the present specification. It is worthwhile to understand that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a nonvolatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to: a phase-change RAM (PRAM), a static RAM (SRAM), a dynamic RAM (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a magnetic cassette, a magnetic tape/magnetic disk memory or another magnetic storage device, or any other non-transmission medium. The computer storage medium can be configured to store information that can be accessed by a computing device. Based on the definition in the present specification, the computer readable medium does not include computer readable transitory media such as a modulated data signal and carrier.

It is worthwhile to further note that, the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that an implementation of the present specification can be provided as a method, a system, or a computer program product. Therefore, the present specification can use a form of hardware only implementations, software only implementations, or implementations with a combination of software and hardware. Moreover, the present specification can use a form of a computer program product that is implemented on one or more computer-usable storage media (including but not limited to a magnetic disk memory, a CD-ROM, an optical memory, etc.) that include computer-usable program code.

The present specification can be described in the general context of computer-executable instructions, for example, a program module. Generally, the program module includes a routine, a program, an object, a component, a data structure, etc. executing a specific task or implementing a specific abstract data type. Alternatively, the present specification can be practiced in distributed computing environments. In these distributed computing environments, tasks are performed by remote processing devices that are connected through a communications network. In a distributed computing environment, the program module can be located in both local and remote computer storage media including storage devices.

What is claimed is:

1. A computer-implemented method for performing mobile payment services on a lock screen of a terminal device, comprising:
  monitoring, by a terminal device that is in lock screen mode, outputs of one or more motion sensors of the terminal device;

determining that a first output of the outputs of the one or more motion sensors satisfies first specified criteria indicative of one or more particular body movements;

in response to determining that the first output of the outputs of the one or more motion sensors satisfies the first specified criteria, displaying, on the terminal device, a scan box within a specified application installed on the terminal device while continuing to monitor the outputs of one or more motion sensors of the terminal device, wherein the specified application allows a user to perform the mobile payment services without unlocking a screen of the terminal device;

after displaying the scan box within the specified application, determining, from the continued monitoring of the outputs of the one or more sensors of the terminal device, whether a second output of the outputs of the one or more motion sensors satisfy the first specified criteria indicative of the one or more particular body movements;

in response to determining from the continued monitoring that the second output of the outputs of the one or more motion sensors does not satisfy the first specified criteria, performing the following steps to execute a first mobile payment service:

obtaining, by the terminal device and while displaying the scan box, a first graphical identifier captured in the scan box; and generating, by the terminal device, and transmitting to a system external to the terminal device, data that causes the system to transfer a first payment to a payee account that is identified by the first graphical identifier; and in response to determining from the continued monitoring that the second output of the outputs of the one or more motion sensors satisfies the first specified criteria, performing the following steps to execute a second mobile payment service:

switching, on the terminal device, from the first mobile payment service to the second mobile payment service while remaining in lock screen mode;

displaying, on the terminal device, a second graphical identifier within the specified application installed on the terminal device; and generating, by the terminal device, and transmitting to the system external to the terminal device, data that causes the system to deduct a second payment from a payor account that is identified by the second graphical identifier;

wherein the one or more motion sensors comprise an acceleration sensor, and wherein the monitoring the outputs of the one or more motion sensors of the terminal device comprises:

monitoring, by the terminal device, an output of the acceleration sensor;

determining, based on the output of the acceleration sensor, that a value of an acceleration of the terminal device is higher than a specified threshold; and in response to determining that the value of an acceleration of the terminal device is higher than the specified threshold, determining that the first output of the outputs of the one or more motion sensors satisfies the first specified criteria indicative of the one or more particular body movements.

2. The computer-implemented method of claim 1, wherein displaying the scan box within the specified application comprises:

obtaining rendering data from the specified application; and displaying the scan box based on the obtained rendering data.

3. The computer-implemented method of claim 1, wherein displaying the scan box within a specified application comprises:

selecting, from a plurality of candidate layouts of a mobile payment interface of the specified application, a layout that includes the scan box; and displaying the layout that includes the scan box on a screen of the terminal device.

4. The computer-implemented method of claim 1, wherein the first graphical identifier comprises a payment collection QR code of the payee account to which the first payment is transferred.

5. The computer-implemented method of claim 1, wherein the second identifier comprises a payment QR code of the payor account from which the second payment is deducted.

6. The computer-implemented method of claim 1, wherein executing the second mobile payment service further comprises:

performing identity verification on a user of the terminal device;

determining that the identity verification on the user is successful; and deducting the second payment from the payor account responsive to determining that the identity verification on the user is successful.

7. The computer-implemented method of claim 6, wherein the payor account is associated with the user of the terminal device.

8. A computer-implemented system for performing mobile payment services on a lock screen of a terminal device, comprising:

a terminal device that comprises one or more computers, and one or more computer memory devices interoperably coupled with the one or more computers and having tangible, non-transitory, machine-readable media storing one or more instructions that, when executed by the one or more computers, perform operations comprising:

monitoring, by the terminal device that is in lock screen mode, outputs of one or more motion sensors of the terminal device;

determining, by the terminal device, that a first output of the outputs of the one or more motion sensors satisfies first specified criteria indicative of one or more particular body movements;

in response to determining that the first output of the outputs of the one or more motion sensors satisfies the first specified criteria, displaying, on the terminal device, a scan box within a specified application installed on the terminal device while continuing to monitor the outputs of one or more motion sensors of the terminal device, wherein the specified application allows a user to perform the mobile payment services without unlocking a screen of the terminal device;

after displaying the scan box within the specified application, determining, by the terminal device, from the continued monitoring of the outputs of the one or more sensors of the terminal device, whether a second output of the outputs of the one or more motion sensors satisfy the first specified criteria indicative of the one or more particular body movements;

in response to determining from the continued monitoring that the second output of the outputs of the one or more motion sensors does not satisfy the first specified criteria, performing, by the terminal device, the following steps to execute a first mobile payment service:
  obtaining, by the terminal device and while displaying the scan box, a first graphical identifier captured in the scan box; and
  generating, by the terminal device, and transmitting to a system external to the terminal device, data that causes the system to transfer a first payment to a payee account that is identified by the first graphical identifier; and
in response to determining from the continued monitoring that the second output of the outputs of the one or more motion sensors satisfies the first specified criteria, performing, by the terminal device, the following steps to execute a second mobile payment service:
  switching, on the terminal device, from the first mobile payment service to the second mobile payment service while remaining in lock screen mode;
  displaying, on the terminal device, a second graphical identifier within the specified application installed on the terminal device; and
  generating, by the terminal device, and transmitting to the system external to the terminal device, data that causes the system to deduct a second payment from a payor account that is identified by the second graphical identifier;
wherein the one or more motion sensors comprise an acceleration sensor, and wherein the monitoring the outputs of the one or more motion sensors of the terminal device comprises:
  monitoring, by the terminal device, an output of the acceleration sensor;
  determining, based on the output of the acceleration sensor, that a value of an acceleration of the terminal device is higher than a specified threshold; and
  in response to determining that the value of an acceleration of the terminal device is higher than the specified threshold, determining that the first output of the outputs of the one or more motion sensors satisfies the first specified criteria indicative of the one or more particular body movements.

9. The computer-implemented system of claim 8, wherein displaying the scan box within the specified application comprises:
  obtaining rendering data from the specified application; and
  displaying the scan box based on the obtained rendering data.

10. The computer-implemented system of claim 8, wherein displaying the scan box within a specified application comprises:
  selecting, from a plurality of candidate layouts of a mobile payment interface of the specified application, a layout that includes the scan box; and
  displaying the layout that includes the scan box on a screen of the terminal device.

11. The computer-implemented system of claim 8, wherein the first graphical identifier comprises a payment collection QR code of the payee account to which the first payment is transferred.

12. The computer-implemented system of claim 8, wherein the second identifier comprises a payment QR code of the payor account from which the second payment is deducted.

13. The computer-implemented system of claim 8, wherein executing the second mobile payment service further comprises:
  performing identity verification on a user of the terminal device;
  determining that the identity verification on the user is successful; and
  deducting the second payment from the payor account responsive to determining that the identity verification on the user is successful.

14. The computer-implemented system of claim 13, wherein the payor account is associated with the user of the terminal device.

15. A non-transitory, computer-readable medium storing one or more instructions executable by a computer system that comprises a terminal device to perform operations for performing mobile payment services on a lock screen of a terminal device, the operations comprising:
  monitoring, by the terminal device that is in lock screen mode, outputs of one or more motion sensors of the terminal device;
  determining, by the terminal device, that a first output of the outputs of the one or more motion sensors satisfies first specified criteria indicative of one or more particular body movements;
  in response to determining that the first output of the outputs of the one or more motion sensors satisfies the first specified criteria, displaying, by the terminal device, on the terminal device, a scan box within a specified application installed on the terminal device while continuing to monitor the outputs of one or more motion sensors of the terminal device, wherein the specified application allows a user to perform the mobile payment services without unlocking a screen of the terminal device;
  after displaying the scan box within the specified application, determining, by the terminal device, from the continued monitoring of the outputs of the one or more sensors of the terminal device, whether a second output of the outputs of the one or more motion sensors satisfy the first specified criteria indicative of the one or more particular body movements;
  in response to determining from the continued monitoring that the second output of the outputs of the one or more motion sensors does not satisfy the first specified criteria, performing, by the terminal device, the following steps to execute a first mobile payment service:
    obtaining, by the terminal device and while displaying the scan box, a first graphical identifier captured in the scan box; and
    generating, by the terminal device, and transmitting to a system external to the terminal device, data that causes the system to transfer a first payment to a payee account that is identified by the first graphical identifier; and
  in response to determining from the continued monitoring that the second output of the outputs of the one or more motion sensors satisfies the first specified criteria, performing, by the terminal device, the following steps to execute a second mobile payment service:
    switching, on the terminal device, from the first mobile payment service to the second mobile payment service while remaining in lock screen mode;
    displaying, on the terminal device, a second graphical identifier within the specified application installed on the terminal device; and generating, by the terminal device, and transmitting to the system external to the terminal device, data that causes the system to deduct a second payment from a payor account that is identified by the second graphical identifier;

wherein the one or more motion sensors comprise an acceleration sensor, and wherein the monitoring the outputs of the one or more motion sensors of the terminal device comprises:

monitoring, by the terminal device, an output of the acceleration sensor;

determining, based on the output of the acceleration sensor, that a value of an acceleration of the terminal device is higher than a specified threshold; and in response to determining that the value of an acceleration of the terminal device is higher than the specified threshold, determining that the first output of the outputs of the one or more motion sensors satisfies the first specified criteria indicative of the one or more particular body movements.

16. The non-transitory, computer-readable medium of claim 15, wherein executing the second mobile payment service further comprises:

performing identity verification on a user of the terminal device;

determining that the identity verification on the user is successful; and deducting the second payment from the payor account responsive to determining that the identity verification on the user is successful.

17. The non-transitory, computer-readable medium of claim 16, wherein the payor account is associated with the user of the terminal device.

* * * * *

UNITED STATES PATENT AND TRADEMARK OFFICE
CERTIFICATE OF CORRECTION

| | | |
|---|---|---|
| PATENT NO. | : 11,403,606 B2 | |
| APPLICATION NO. | : 16/888547 | |
| DATED | : August 2, 2022 | |
| INVENTOR(S) | : Jing Li et al. | |

It is certified that error appears in the above-identified patent and that said Letters Patent is hereby corrected as shown below:

On the Title Page

Column 2 (Other Publications), Line 1, delete "stamp.*" and insert -- stamp (Year: 2017).* --.

Signed and Sealed this
Twenty-seventh Day of December, 2022

Katherine Kelly Vidal
*Director of the United States Patent and Trademark Office*